US009586628B2

(12) United States Patent
Jensen et al.

(10) Patent No.: US 9,586,628 B2
(45) Date of Patent: Mar. 7, 2017

(54) HEMMED BODY PANEL FOR ATTACHMENT TO A BODY STRUCTURE

(71) Applicant: GM GLOBAL TECHNOLOGY OPERATIONS LLC, Detroit, MI (US)

(72) Inventors: Charles E. Jensen, Shelby Township, MI (US); Robert N. Saje, Shelby Township, MI (US); Peter M. Parlow, Columbus, MI (US); Jonathon E. Rich, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/645,912

(22) Filed: Mar. 12, 2015

(65) Prior Publication Data

US 2016/0264181 A1 Sep. 15, 2016

(51) Int. Cl.
*B62D 27/02* (2006.01)
*B62D 29/00* (2006.01)
*B62D 25/00* (2006.01)

(52) U.S. Cl.
CPC ........... *B62D 27/023* (2013.01); *B62D 25/00* (2013.01); *B62D 27/026* (2013.01); *B62D 29/00* (2013.01)

(58) Field of Classification Search
CPC ..... B62D 27/02; B62D 27/026; B62D 27/065
USPC .......................................... 296/29
See application file for complete search history.

(56) References Cited

U.S. PATENT DOCUMENTS

| 3,535,843 | A | * | 10/1970 | Hughes | B62D 27/02 52/394 |
| 2008/0088157 | A1 | * | 4/2008 | Chen | B62D 25/06 296/209 |
| 2014/0210233 | A1 | * | 7/2014 | Brymerski | B60J 5/0415 296/191 |
| 2015/0084378 | A1 | * | 3/2015 | Huhn | B21D 39/021 296/210 |
| 2015/0375796 | A1 | * | 12/2015 | Minei | B62D 27/023 296/29 |

FOREIGN PATENT DOCUMENTS

FR 2717228 A1 * 9/1995

OTHER PUBLICATIONS

Machine Translation of FR2717228A1, printed from the EPO website, Apr. 2, 2016.*

* cited by examiner

*Primary Examiner* — Jason S Morrow
(74) *Attorney, Agent, or Firm* — Quinn Law Group, PLLC

(57) ABSTRACT

A body panel that is attachable to a body structure is provided. The body panel has a single thickness portion and a double thickness edge portion where the body panel is hemmed over onto itself and is attachable to the body structure. The body panel may be made of a metal material or a non-metal material. The attachment may be via a weld, a fastener, and/or an adhesive.

17 Claims, 3 Drawing Sheets

HEMMED BODY PANEL FOR ATTACHMENT TO A BODY STRUCTURE

TECHNICAL FIELD

This disclosure relates to a hemmed body panel for attachment to a body structure.

BACKGROUND

A vehicle typically includes a body structure having body panels and structural members, such as rails, bars, and/or beams. The body panels are attached to the body structure and may become part of the body structure, once they are attached. The body panels may be large in area and may be thin in order to minimize vehicle mass. The body panels may be attached to the body structure via a weld, a fastener, and/or an adhesive. This disclosure applies to any panel which is attached to a structural member or to another panel in any machine or manufacture.

SUMMARY

A body panel for attachment to a body structure is provided. The body panel includes a single thickness portion and a double thickness edge portion where the body panel hemmed over onto itself is attachable to the body structure. The body panel may be made of a metal material or a non-metal material. The attachment may be via a weld, a fastener, and/or an adhesive.

A vehicle is also provided. The vehicle includes a body structure and a body panel attached to the body structure. The body panel has a single thickness portion and a double thickness edge portion where the body panel is hemmed over onto itself and is attached to the body structure. The body panel may be made of a metal material or a non-metal material. The attachment may be via a weld, a fastener, and/or or an adhesive.

The body panel and the vehicle may provide increased strength and/or stiffness of the attachment of the body panel to the body structure and may avoid the need to add reinforcements to the body panel in the area of the attachment.

The above features and advantages and other features and advantages of the present teachings are readily apparent from the following detailed description of the best modes for carrying out the present teachings when taken in connection with the accompanying drawings.

DETAILED DESCRIPTION

Figure 1:
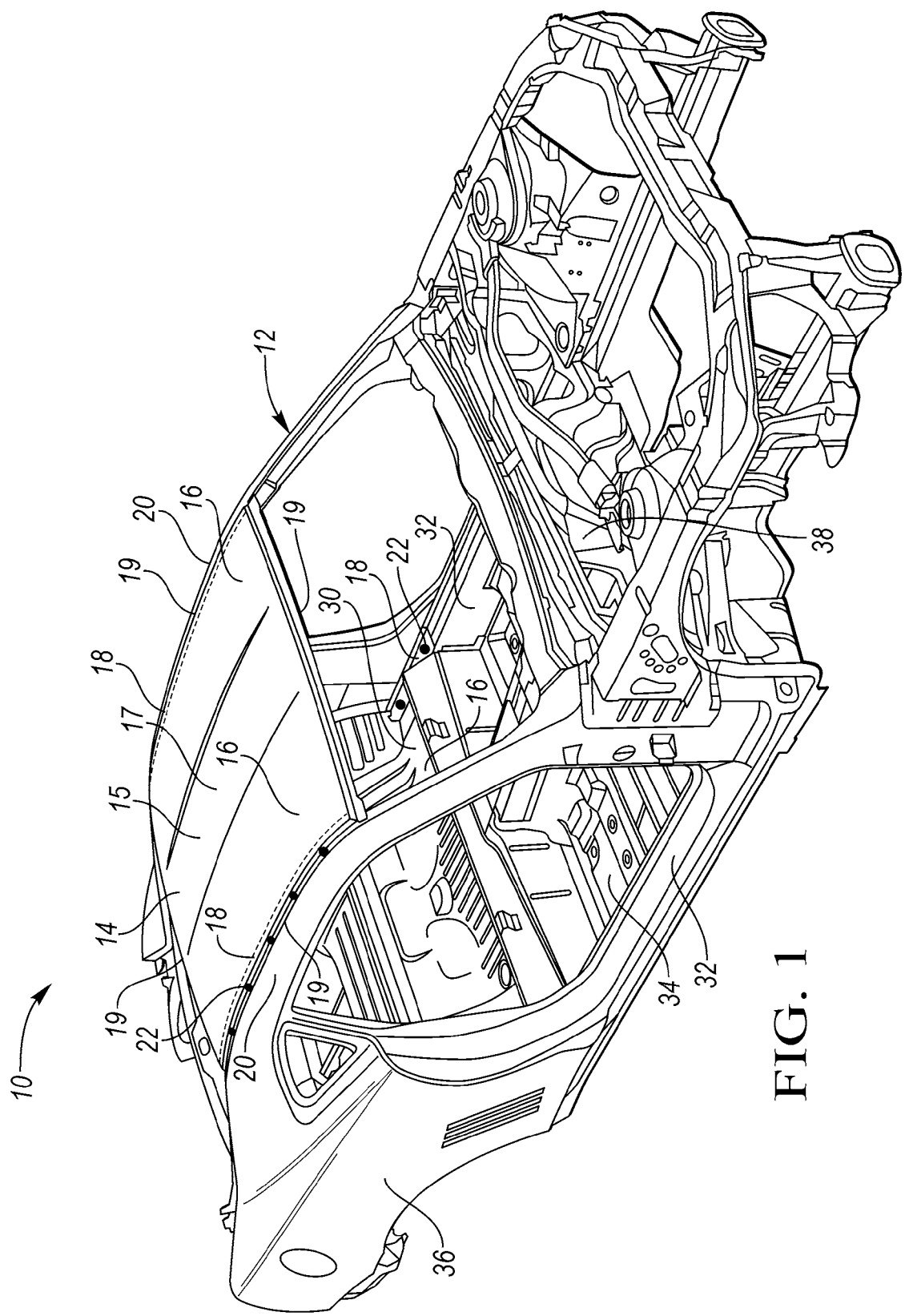
FIG. 1 is a schematic perspective illustration of a vehicle body structure having a body panel that includes a double thickness edge portion where the body panel is hemmed over onto itself and is attached to the body structure.

Referring to the drawings, wherein like reference numbers refer to like components throughout the views, FIG. 1 shows an example vehicle 10 including a body structure 12 and a body panel 14. The body structure 12 may include a roof rail 20, a rocker rail 32, and/or other rails, beams, or bars, as understood by those skilled in the art. The body structure 12 may be made of a metal material, a composite material, a plastic material, or any other suitable material. The body panel 14 may be a roof panel, as shown, or may be any other body panel, including but not limited to a rear floor panel 30, a front floor panel 34, a quarter panel 36, a dash panel 38, and/or any other body panel, as understood by those skilled in the art. The body panel may be made of a metal material, a non-metal material, a thermoplastic material, or any other suitable material. The thermoplastic material may be a composite material and may be filled with particles or may be reinforced with fibers. The body panel 14 is attached to the body structure 12 and, once attached, may become part of the body structure 12.

Figure 3:
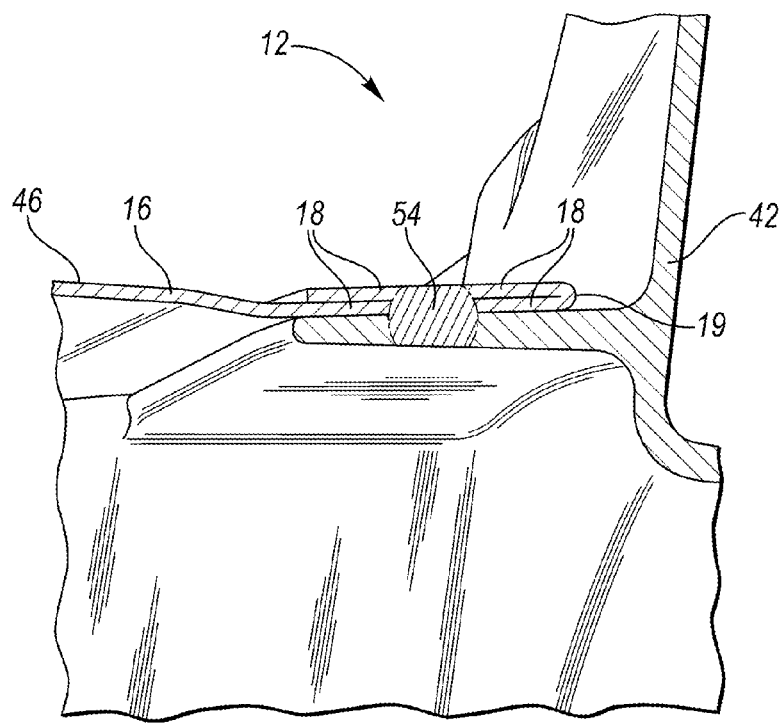
FIG. 3 is a schematic cross-sectional illustration, partially in elevation, of the body structure of FIG. 2 taken at line 3-3 of FIG. 2, showing a body panel including a double thickness edge portion where the body panel is hemmed over onto itself and is attached to the body structure via a weld.
Figure 4:
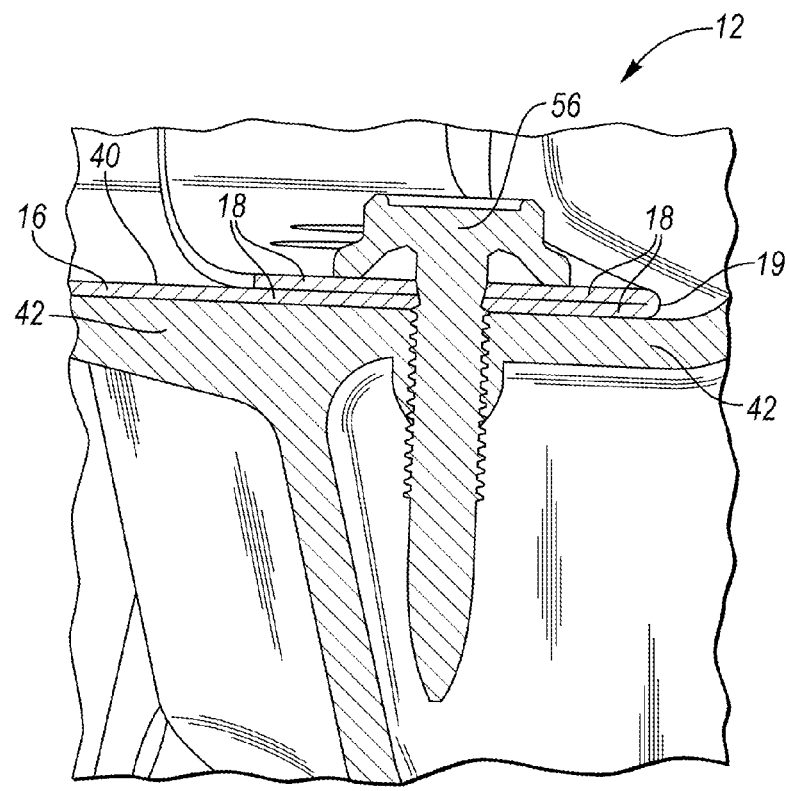
FIG. 4 is a schematic cross-sectional illustration, partially in elevation, of the body structure of FIG. 2 taken at line 4-4 of FIG. 2, showing another body panel including a hemmed over double thickness edge portion where the body panel is hemmed over onto itself and is attached to the body structure via a fastener.

The body panel 14 has a single thickness portion 16 and a double thickness edge portion 18 where the body panel 14 is hemmed over onto itself, as best seen in FIGS. 3 and 4. Hemmed over onto itself is defined as the body panel 14 folded over by substantially 180 degrees so that the portion of the body panel 14 that is folded over contacts the portion of the body panel 14 that is not folded over. The double thickness edge portion is located at an edge 19 of the body panel 14. Returning to FIG. 1, the single thickness portion 16 extends over most of the surface area 15 of the body panel 14 and is primarily located in a central portion 17 of the body panel 14. However, the single thickness portion 16 may extend to one or more of the edges 19 of the body panel 14. The single thickness portion 16 may be thin to minimize the mass of the body panel 14, the body structure 12, and/or the vehicle 10. The hemmed over double thickness edge portion 18 may be located at the edge 19 of the body panel 14 where the body panel 14 is attached to the body structure 12. The hemmed over double thickness edge portion 18 may be located at one or more edges 19, at a portion of one or more edges 19, and/or at all edges 19 of the body panel 14 where the body panel 14 is attached to the body structure 12. The hemmed over double thickness edge portion 18 may or may not be located the edge 19 of the body panel 14 where the body panel 14 is not attached to the body structure 12.

The body panel 14 is attached to the body structure 12 via a joint or attachment 22. The joint or attachment 22 attaches the hemmed over double thickness edge portion 18 of the body panel 14 to the body structure 12. Attaching the body panel 14 to the body structure 12 at the hemmed over double thickness edge portion 18 may improve the strength and stiffness of the joint or attachment 22 between the body panel 14 and the body structure 12. The joint or attachment 22 may be via a weld 44, as shown in FIG. 2, via a fastener 48, as shown in FIG. 2, and/or via an adhesive (not shown).

FIG. 1 also shows the rear floor panel 30 having a double thickness edge portion 18 where the rear floor panel 30 is hemmed over onto itself and is attached to the rocker rail 32. Examples of other body panels 14 that may include a double thickness edge portion 18 where the body panel 14 is hemmed over onto itself and attached to the body structure 12 include, but are not limited to, the front floor panel 34, the quarter panel 36, the dash panel 38, and any other body panel, as understood by those skilled in the art.

Figure 2:
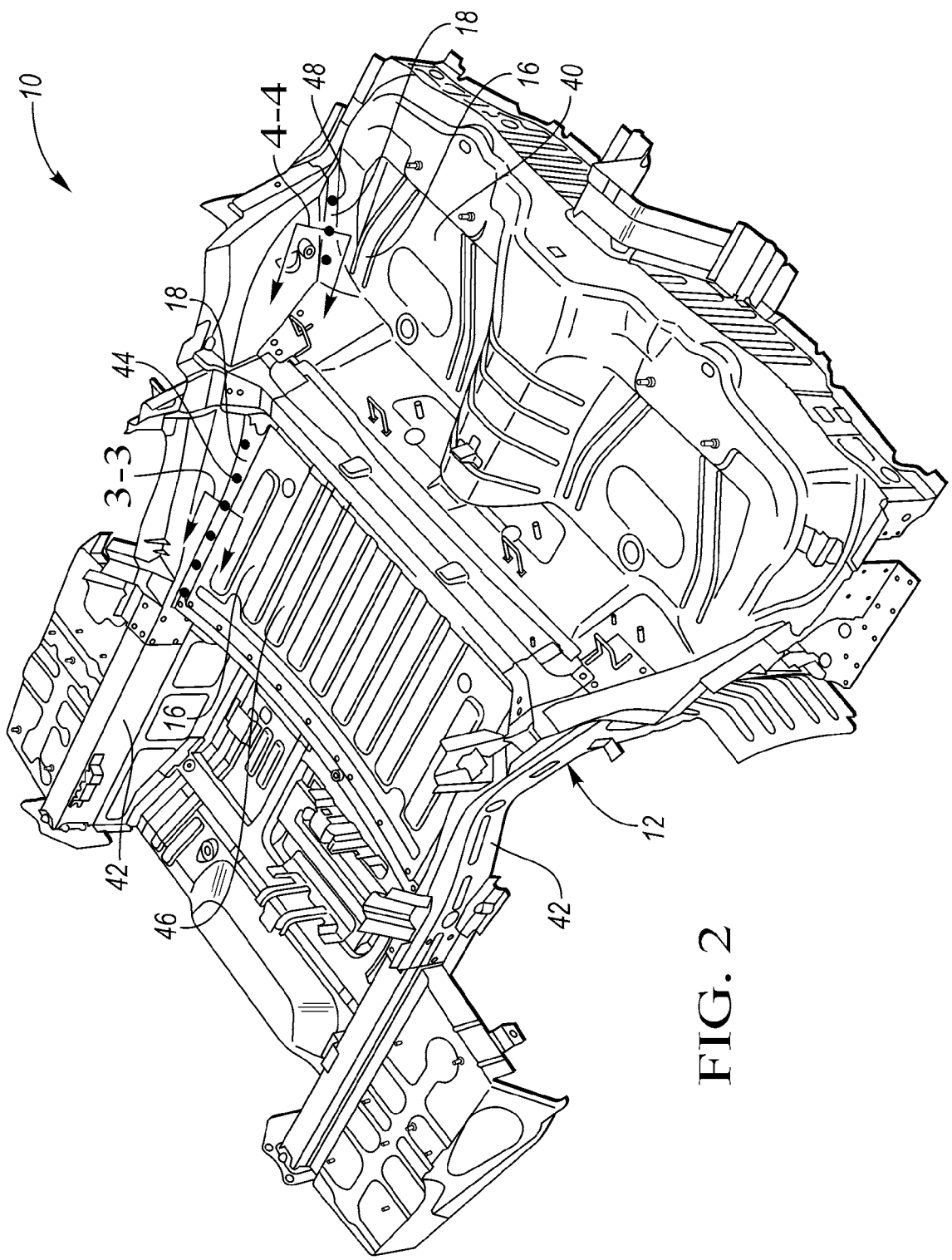
FIG. 2 is a fragmentary schematic perspective illustration of a portion of another vehicle body structure having a body panel including a double thickness edge portion where the body panel is hemmed over onto itself and is attached to the body structure.

Referring now to FIG. 2, another example embodiment of the vehicle 10 including the body structure 12 is shown. The body structure 12 includes a rear rail 42, a rear floor front panel 40, and a rear floor rear panel 46. The rear floor front panel 40 includes a double thickness edge portion 18 where the rear floor front panel 40 is hemmed over onto itself and attached to the rear rail 42. The rear floor rear panel 46 includes a double thickness edge portion 18 where the rear floor rear panel 46 is hemmed over onto itself and attached to the rear rail 42. In this embodiment, the rear floor rear panel 46 is attached to the rear rail 42 via a weld 44. Nonlimiting examples of the weld 44 include a spot weld, a laser weld, and an arc weld. Also in this embodiment, the rear floor front panel 40 is attached to the rear rail 42 via a fastener 48. Nonlimiting examples of the fastener 48 include a flow drill screw, a sheet metal screw, a rivet, and a threaded bolt and nut type fastener.

Referring now to FIG. 3, a cross-section of the joint or attachment 22 of the rear floor rear panel 46 to the rear rail 42 at line 3-3 of FIG. 2 is shown. In this embodiment, the joint or attachment 22 is via a spot weld 54, as understood by those skilled in the art. The spot weld 54 attaches the hemmed over double thickness edge portion 18 of the rear floor rear panel 46 to the rear rail 42. The spot weld 54 may extend through both layers of the hemmed over double thickness edge portion 18 and through the rear rail 42.

Referring now to FIG. 4, a cross-section of the joint or attachment 22 of the rear floor front panel 40 to the rear rail 42 at line 4-4 of FIG. 2 is shown. In this embodiment, the joint or attachment 22 is via a flow drill screw 56, as understood by those skilled in the art. The flow drill screw 56 attaches the hemmed over double thickness edge portion 18 of the rear floor front panel 40 to the rear rail 42. The flow drill screw 56 extends through both layers of the hemmed over double thickness edge portion 18 and through the rear floor front panel 40.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A body panel attachable to a body structure, the body panel comprising:
    a single thickness portion; and
    a double thickness edge portion where the body panel is hemmed over onto itself and attachable to the body structure via an attachment that extends through the double thickness edge portion;
    wherein the double thickness edge portion is arranged along substantially the same plane as the single thickness portion, which is positioned adjacent to the double thickness edge portion.

2. The body panel of claim 1, wherein the body panel is a metal material.

3. The body panel of claim 2, wherein the double thickness edge portion is attachable to the body structure via a weld.

4. The body panel of claim 3, wherein the weld is a spot weld.

5. The body panel of claim 2, wherein the double thickness edge portion is attachable to the body structure via a fastener.

6. The body panel of claim 5, wherein the fastener is a flow drill screw.

7. The body panel of claim 1, wherein the body panel is a non-metal material.

8. The body panel of claim 7, wherein the double thickness edge portion is attachable to the body structure via a weld.

9. The body panel of claim 7, wherein the double thickness edge portion is attachable to the body structure via a fastener.

10. A vehicle, comprising:
    a body structure; and
    a body panel attached to the body structure and having:
        a single thickness portion; and
        a double thickness edge portion where the body panel is hemmed over onto itself and attached to the body structure via an attachment that extends through the double thickness edge portion;
        wherein the double thickness edge portion is arranged along substantially the same plane as the single thickness portion, which is positioned adjacent to the double thickness edge portion.

11. The vehicle of claim 10, wherein the body panel is a metal material.

12. The vehicle of claim 11, wherein the double thickness edge portion is attached to the body structure via a weld.

13. The vehicle of claim 12, wherein the weld is a spot weld.

14. The vehicle of claim 11, wherein the double thickness edge portion is attached to the body structure via a fastener.

15. The vehicle of claim 14, wherein the fastener is a flow drill screw.

16. The vehicle of claim 10, wherein the body panel is a non-metal material.

17. The vehicle of claim 16, wherein the double thickness edge portion is attached to the body structure via a fastener.

* * * * *